T. MEREDITH.
CARBURETER.
No. 172,144.
Patented Jan. 11, 1876.
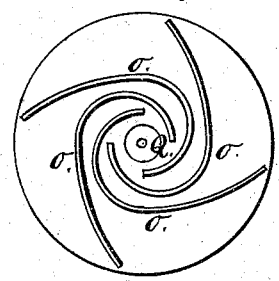
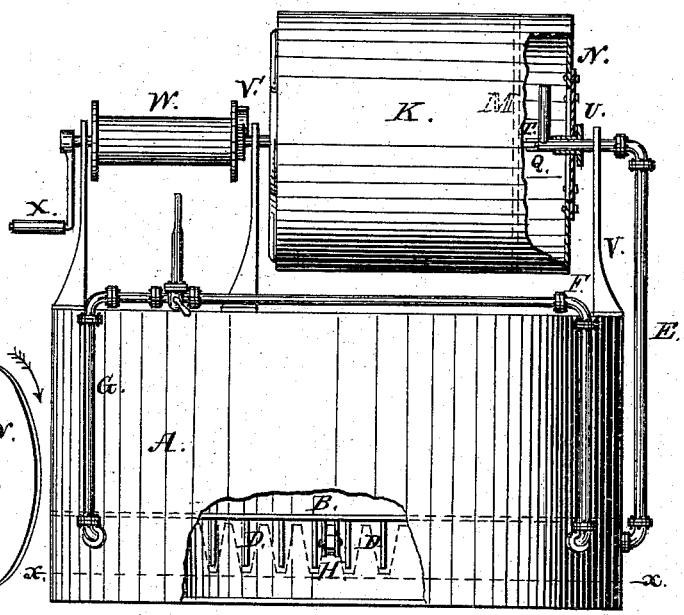
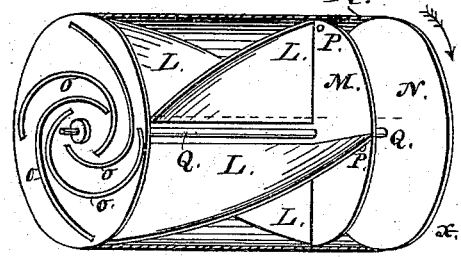
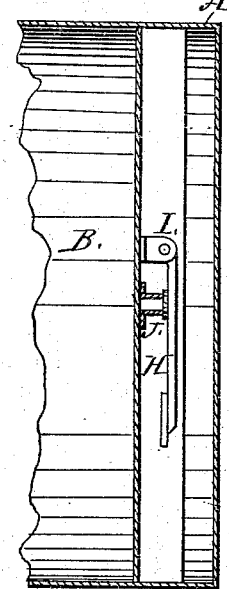
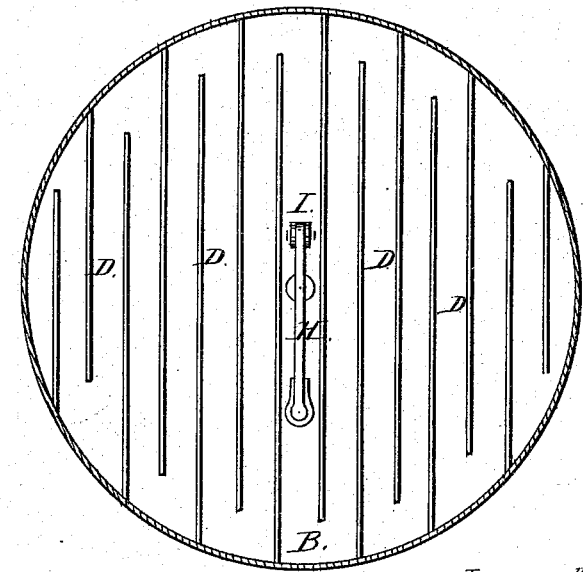
Witnesses:
L. A. Bunting
A. F. Bruns.
Inventor:
Thos. Meredith
by Lewis L. Coburn
Atty

UNITED STATES PATENT OFFICE.

THOMAS MEREDITH, OF BATAVIA, ILLINOIS, ASSIGNOR OF ONE-HALF HIS RIGHT TO EDWIN MEREDITH, OF SAME PLACE.

IMPROVEMENT IN CARBURETERS.

Specification forming part of Letters Patent No. 172,144, dated January 11, 1876; application filed February 20, 1875.

*To all whom it may concern:*

Be it known that I, THOMAS MEREDITH, of Batavia, county of Kane and State of Illinois, have invented a Carbureter, of which the following is a specification, reference being had to the accompanying drawings, which form a part thereof.

My invention consists, first, in a water-tight cylinder capable of rotation, internally divided by spiral partitions, and a series of curved air-feeding pipes on the outside end of said cylinder; second, in a packing-disk to prevent the escape of air along the exterior of the exit-pipe from the air-chamber of said cylinder; third, in the arrangement of several outlet-pipes on the same level, from one or another of which gas may be drawn at pleasure to equalize quality.

In the accompanying drawings, Figure 1 represents a side elevation of my carbureter, with a portion broken away to show the interior. Fig. 2 represents a section of the carbureter taken at the line $x$ $x$ in Fig. 1. Fig. 3 represents an end view of the air-supply cylinder. Fig. 4 represents a perspective view of the same, with the casing cut in section, leaving the interior parts uncut. Fig. 5 represents a section of a portion of the carbureter, showing the partition between the reservoir for the oil and the carbureting-chamber, with the float-valve for controlling the flow of the oil into the carbureting-chamber.

A is the cylinder, the oil-reservoir B and the carbureting-chamber C being inclosed therein. D are partitions, covered with a Canton flannel or other suitable fabric to make a carbureting-surface. E is the air-pipe, through which the air is forced into the carbureting-chamber. F and G are gas-pipes, through which the gas is taken from the carbureter. If taken through the pipe F only a part of the carbureting-surface will have been used in making the gas, but, if taken through the pipe G, the air will have passed in contact with the entire carbureting-surface. When the oil is very volatile the gas will be sufficiently rich if part of the carbureting-surface be used. When a heavier oil is used, or the temperature cold, the whole surface will be required; or, by taking a part from each of the pipes G and F, the richness of the gas can be regulated. H is a pivoted float-valve, pivoted at I, and covers the pipe J, and regulates the flow of oil from the reservoir B into the carbureting-chamber. The oil carries the float end of this pivoted valve, so that, as it falls slightly below the end of the pipe J, the float end of the valve falls and opens the pipe, the oil immediately flows through the pipe, and, as it rises in the carbureting-chamber, it raises the float and closes the valve.

This device admits of a large quantity of oil being kept in the reservoir B, and flowing down gradually and supplying the carbureting-chamber as it is consumed therefrom in the manufacture of gas. The air is supplied through the revolving drum K. The interior of this drum is divided into four chambers or apartments between the spiral partitions L. These spiral partitions extend from the cylindrical case of the drum K to near the center of the drum, making an air-tight spiral partition, the curve of which extends just one-fourth of the way around the drum. M is an interior head of the drum K, and the space between it and the head N constitutes an air-chamber into which the air-pipe E extends, as clearly shown in Fig. 1. O are four curved pipes, through which the air is admitted into the four spiral chambers in the drum K. These curved pipes are so arranged that the air passes through them into the chambers, and then is forced through the openings P into the air-chamber, from which it can escape only through the pipe E. The drum K, which contains the spiral partitions, should always be kept filled with sufficient water to cover the edges of the spiral partitions L, which are nearest the center of the drum, so that, whatever the position of a partition in the drum, as the drum revolves its free edge, which is near the shaft Q of the drum, will always be under water. This keeps each chamber sealed air-tight from its adjacent chamber. Now, as the drum K is revolved in the direction indicated by the arrow, the moment that one of the corners of a spiral chamber in the drum comes above the water-line air is admitted into it through its curved pipe O until the chamber is full of air, and this takes place when the corner at which the pipe O admits air into the chamber has been turned to the water-line on the opposite side of the drum. Now the water flows into the chamber and partially fills the pipe O, and as the curved chamber passes into the water the air is forced out of it through the opening P, the opening P being at the point of the chamber which is the last to pass under the water, while the point at which the pipe O opens into the chamber is the first to rise above the water as the drum is revolved, and is the first to pass under the water of any part of the chamber. The pipes O are curved on the outside of the drum K in such shape that, while the water flows from the chamber in the drum down into said pipes, it will not flow through the pipes, but will flow back into the drum. By this construction each spiral chamber is filled with air through its curved pipe O as it is raised above the water in the drum by the revolution thereof, and, as the chamber passes under the water again upon the opposite side, the air that is in it is forced by the water out of it through the opening P, and thence on through the pipe E into the carbureter. The shaft Q of the drum K has a bearing at T on the pipe E, and U is a flexible packing-disk, secured at its edges to the end plate of the cylinder K to close the opening therein, through which the end of pipe E passes, to close said opening around said pipe E, but admits of no escape of air except through the pipe E. V is a standard supporting the pipe E. W is a windlass, from which a weight is suspended for driving the drum K. X is a crank for winding the rope of said weight upon the windlass. Y' is a pawl for connecting said windlass to the shaft S of the drum K.

I claim—

1. The combination of the curved pipes O on the outside of the drum K, and in the atmosphere solely, and the spiral chambers in the drum K, substantially as and for the purpose set forth.

2. In combination with the drum K, mounted upon a shaft, S, one of whose bearings is in the stationary pipe E, inside of said drum, the elastic packing-disk U, to close the orifice through which said pipe E passes.

3. In combination with the carbureting-chamber C, divided by overlapping vertical partitions D D, the air-pipe E, and gas-pipes F G, all opening into said chamber on the same plane, above the surface of the hydrocarbon liquid.

THOS. MEREDITH.

Witnesses:
LEWIS L. COBURN,
HEINR. L. BRUNS.